United States Patent [19]

Stewart, Sr. et al.

[11] Patent Number: 4,591,369

[45] Date of Patent: May 27, 1986

[54] DUST BAG MOUNT ARRANGEMENT FOR CANISTER VACUUM CLEANER

[75] Inventors: Bruce E. Stewart, Sr., Maplewood; John B. Lyman, Bloomington, both of Minn.

[73] Assignee: Whirlpool Corporation, Benton Harbor, Mich.

[21] Appl. No.: 664,947

[22] Filed: Oct. 24, 1984

[51] Int. Cl.⁴ .............................................. B01D 46/02
[52] U.S. Cl. ........................................ 55/374; 55/378; 55/493; 55/DIG. 2; 15/352
[58] Field of Search .................................. 55/374–378, 55/492, 493, DIG. 2, DIG. 3, 373, 369; 15/339, 352

[56] References Cited

U.S. PATENT DOCUMENTS

| | | | |
|---|---|---|---|
| 2,447,500 | 8/1948 | French | 55/373 |
| 2,676,669 | 4/1954 | Lampe | 55/369 X |
| 2,742,105 | 4/1956 | Dow | 55/373 X |
| 2,766,844 | 10/1956 | Humphrey | 182/37 |
| 2,784,800 | 3/1957 | Segesman | 183/43 |
| 2,804,164 | 8/1957 | Brace | 55/378 X |
| 2,815,890 | 12/1957 | Humphrey | 55/378 X |
| 3,090,181 | 5/1963 | Korrell et al. | 55/376 |
| 3,132,932 | 5/1964 | Pauler et al. | 55/376 |
| 3,199,137 | 10/1965 | Segesman | 15/323 |
| 3,238,706 | 3/1966 | Kurlinski | 55/378 X |
| 3,375,541 | 4/1968 | Fromknecht | 15/327 |
| 3,616,521 | 4/1969 | Fesco | 55/367 |
| 3,636,285 | 1/1972 | Wickham et al. | 15/339 X |
| 3,738,091 | 6/1973 | Fesco | 55/367 |
| 4,044,421 | 8/1977 | Kristenson et al. | 15/339 |

Primary Examiner—Charles Hart
Attorney, Agent, or Firm—Wood, Dalton, Phillips, Mason & Rowe

[57] ABSTRACT

A vacuum cleaner construction having a filter bag mount movably mounted to the base of the vacuum cleaner canister. Biasing structure is provided for causing the bag mount to extend into an obstructing disposition relative to the hood of the canister preventing closing of the hood in the absence of a filter bag being mounted to the bag mount. Mounting of the filter bag to the bag mount causes a movement of the bag mount against the biasing structure to a lowered disposition within the dirt-collecting space of the canister base, permitting the hood to be closed. The bag mount includes improved sealing structure for facilitated sealed connection of a suction hose end thereto, with the hood maintained in a closed disposition. The bag mount includes an annular seal for sealing the hose connection thereto and an annular flange for removably securing the filter bag mounting plate thereto.

19 Claims, 7 Drawing Figures

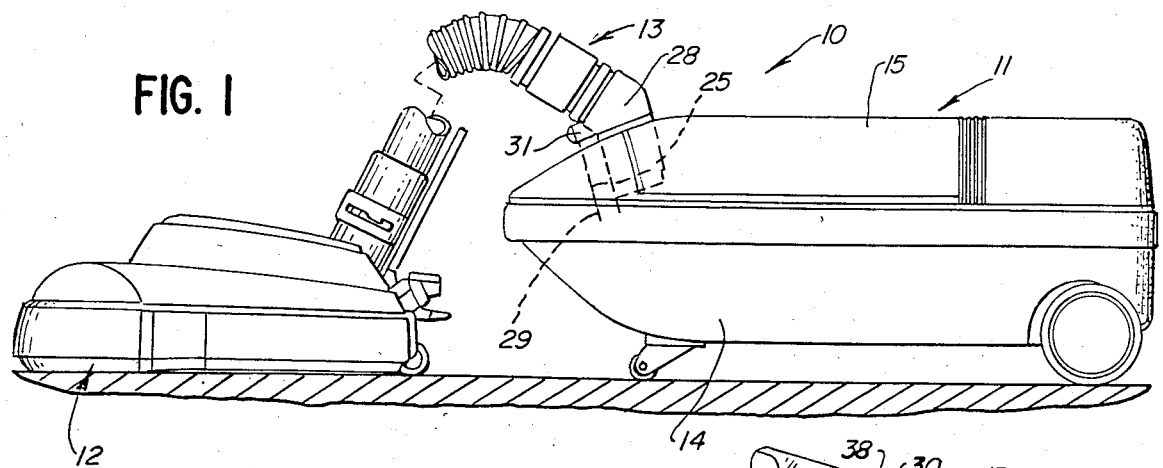
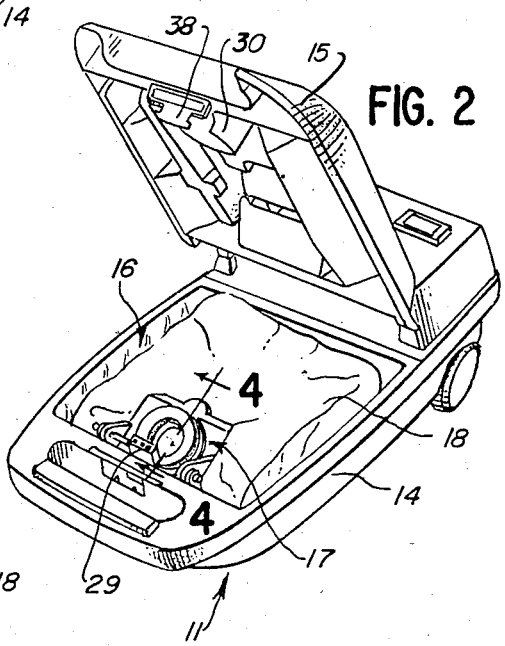
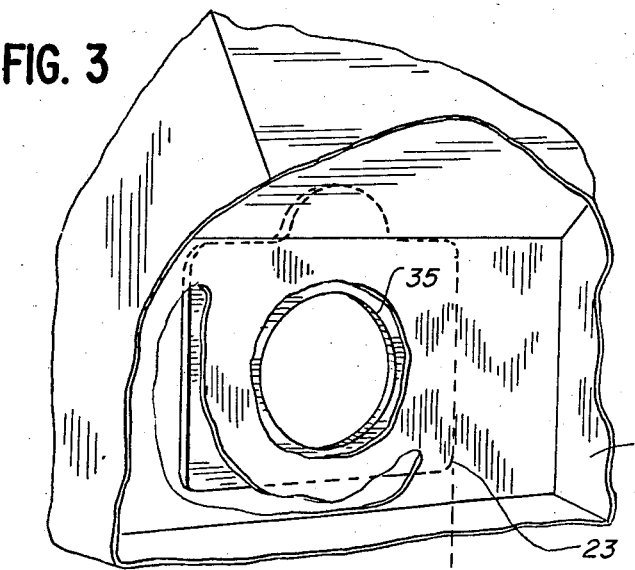
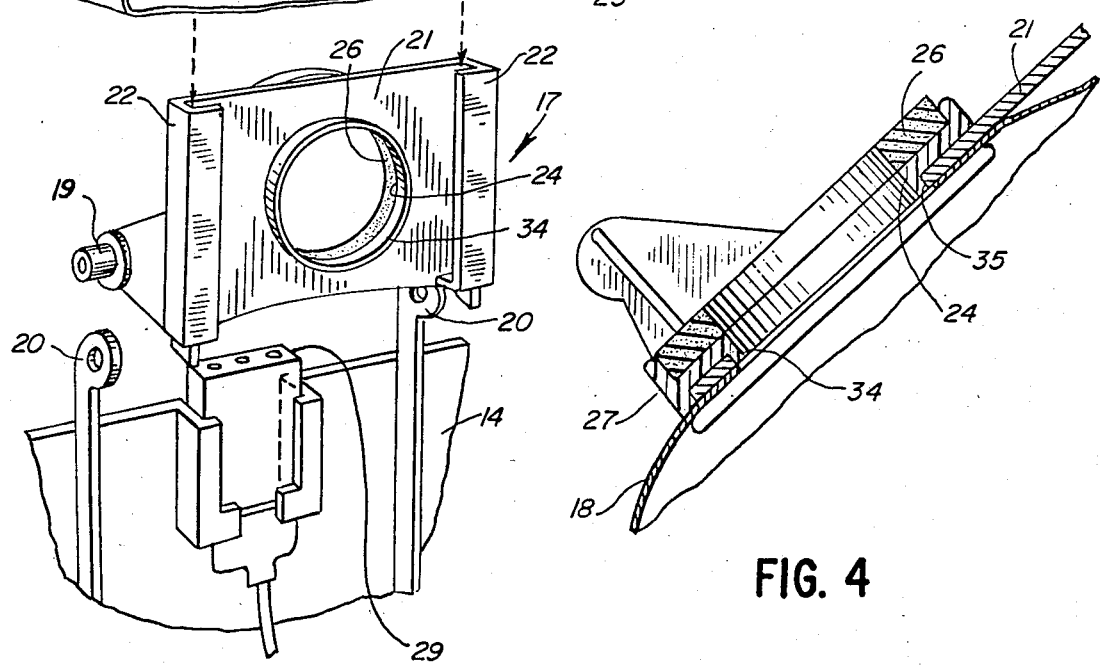
FIG. 1
FIG. 2
FIG. 3
FIG. 4

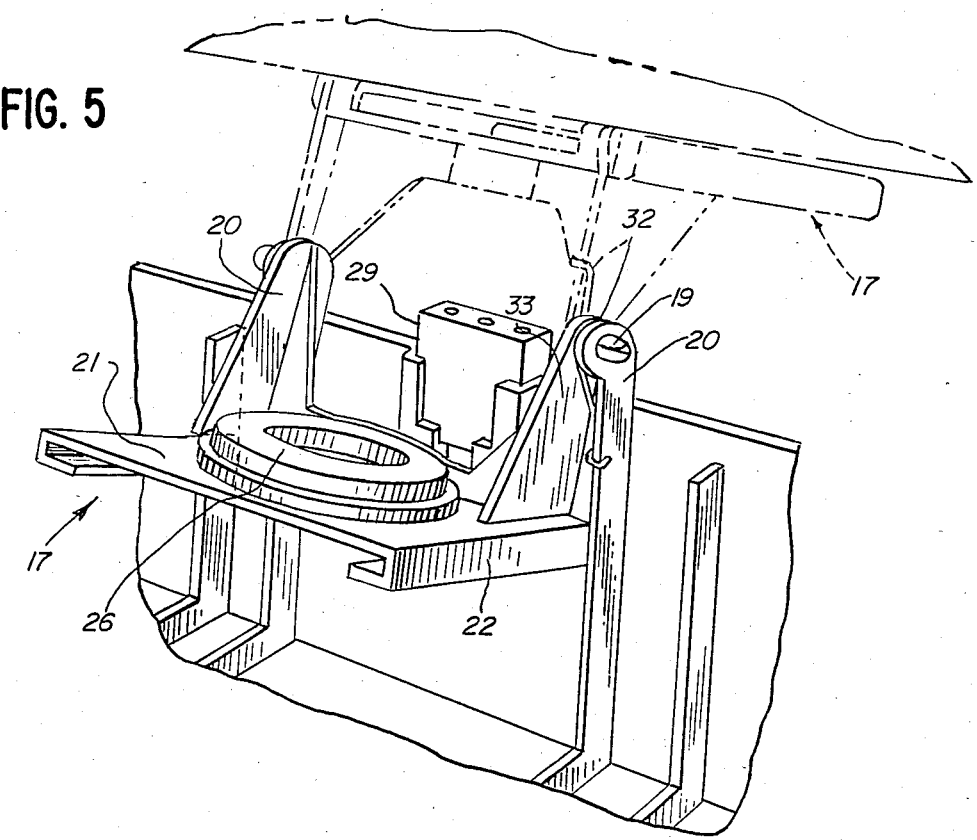
FIG. 5
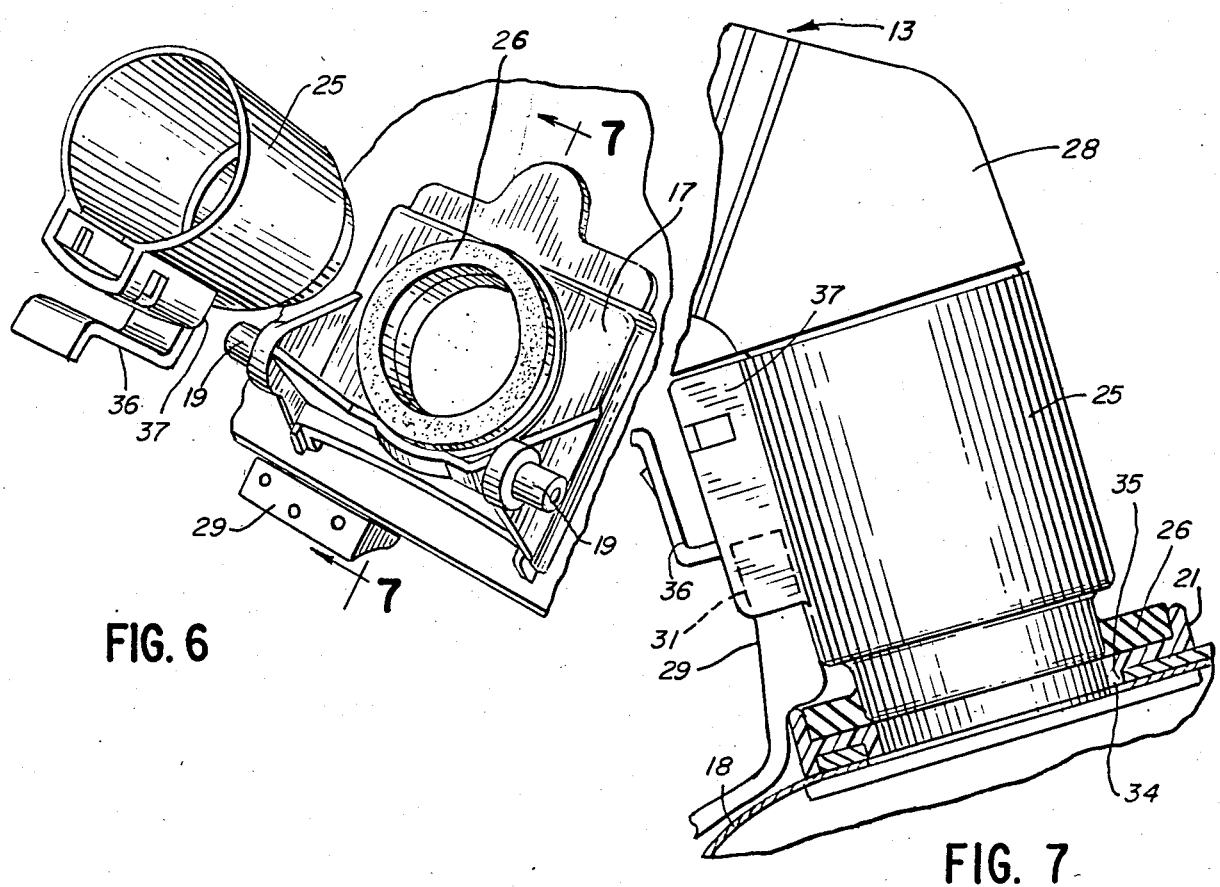
FIG. 6
FIG. 7

DUST BAG MOUNT ARRANGEMENT FOR CANISTER VACUUM CLEANER

BACKGROUND OF THE INVENTION

1. Field of the Invention

This invention relates to vacuum cleaners and in particular to vacuum cleaners having a removable dirt collection filter bag removably carried within a housing portion thereof.

2. Background Art

In one conventional form of vacuum cleaner, a dirt collecting filter bag is removably mounted within a canister portion of the vacuum cleaner. The canister conventionally includes a base portion and a hood portion movably associated with the base portion to provide access to the dirt-collecting space in which the filter bag is mounted.

One such vacuum cleaner construction is illustrated in U.S. Pat. No. 3,132,932 of Charles J. Pauler et al., which patent is owned by the assignee hereof. In the Pauler et al. vacuum cleaner construction, means are provided for connecting a plurality of bags successively in operative association with the air moving means, permitting facilitated association and disassociation for subsequent disposal when the bags are filled with dirt.

It is further conventional to provide the successive dirt collecting bags from a separate source and install them in the dirt collecting space by opening the canister as by raising the hood portion thereof to expose the dirt-collecting space for removal of the dirt-laden bag and replacement with a new filter bag.

A problem arises in such vacuum cleaner structures, however, in that, at times, the user may remove the dirt-collecting bag and fail to install a new bag before closing the housing. Operation of the vacuum cleaner under such conditions permits the dirt to be discharged in the dirt-collecting space without any filtering of the dirt from the suction air, thereby undesirably delivering the dirt to the suction fan means and discharging it back into the space above the floor surface being cleaned.

SUMMARY OF THE INVENTION

The present invention comprehends an improved vacuum cleaner construction together with means for effectively preventing closing of the housing in the absence of a filter bag being provided to receive the dirt-laden air in the dirt-collecting space.

In the illustrated embodiment, the housing comprises a canister having a base and a hood pivotally mounted to the base for selective positioning to expose the dirt-collecting space when desired.

Improved means are provided for mounting the dirt-collecting bag to receive the dirt-laden air from the suction nozzle and hose. In the illustrated embodiment, the bag mount is arranged to be disposed automatically in a blocking disposition to prevent closing of the hood on the base in the absence of a filter bag being mounted to the bag mount.

More specifically, in the present invention, the improvement includes a bag mount carried by the base for removably mounting a filter bag in the bag space, means for automatically disposing or positioning the bag mount (a) in a blocking disposition for preventing the closing of the access opening by the hood as an incident of the bag mount being free of a filter bag mounted thereto, and (b) in an operative disposition and concurrently permitting the closing of the access opening by the hood, the bag mount being caused to be disposed or positioned in the operative position as an incident of the mounting of a filter bag to the bag mount and for reception of the filter bag in the bag space, and means on the hood defining an access opening aligned with the position of the bag mount in the operative disposition for permitting a suction hose end to be extended therethrough into removably connected association with the bag mount for delivering dirt-laden air to the filter bag. The present invention may advantageously be employed in a canister vacuum cleaner structure wherein the suction hose end is arranged for swivel connection to a hose assembly including a plurality of electrical conductors as disclosed herein.

The bag mount further defines an annular seal for removably sealingly engaging the suction hose end as an incident of the suction hose end being inserted against the bag mount for connection to a filter bag mounted to the bag mount.

Means are provided for biasing the bag mount to the blocking position and, in the illustrated embodiment, the biasing means comprises coil spring means.

The base, in the illustrated embodiment, is provided with a stop shoulder for limiting the movement of the bag mount by the spring means and, in the illustrated embodiment, the spring means disposes the bag mount in a hood blocking position, as determined by the location of the stop means.

In the illustrated embodiment, receptacle means are provided fixed to the housing for providing an electrical connection adjacent to the movable bag mount, the bag mount being disposed suitably to provide an air conduction connection to the hose end of an electrical suction hose concurrently with the connection of power plug means on the hose end to the receptacle means carried by the housing, thereby facilitating automatic connection and disconnection of the hose end to the canister.

Another feature of the present invention is the automatic disposition of the bag mount in the hood-blocking position to at the same time cover the electrical receptacle in the housing base when no filter bag is in place, thus helping to prevent exposure to a safety hazard in the form of live electrical contacts.

Thus, the vacuum cleaner construction of the present invention is extremely simple and economical, while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary side elevation of a vacuum cleaner structure embodying the invention;

FIG. 2 is a perspective view of the canister of the vacuum cleaner illustrating the bag mount of the invention;

FIG. 3 is a fragmentary exploded view illustrating the assembly of the filter bag and bag mount in the canister;

FIG. 4 is a fragmentary vertical section taken substantially along the line 4—4 of FIG. 2;

FIG. 5 is a fragmentary perspective view illustrating the different positions of the bag mount, including a broken line disposition wherein the bag mount blocks the closing of the canister hood onto the base and covers the receptacle openings in the absence of a filter bag being mounted to the bag mount;

FIG. 6 is a fragmentary exploded perspective view illustrating the assembly of the hose end connector to the bag mount and filter bag, the hood being omitted for clarity; and FIG. 7 is a section taken substantially along the line 7—7 of FIG. 6 with the hose end connector assembled to the bag mount.

DESCRIPTION OF THE PREFERRED EMBODIMENT

In the illustrative embodiment of the invention as disclosed in the drawing, a vacuum cleaner generally designated 10 is shown to comprise a canister generally designated 11 and a dirt pickup nozzle generally designated 12 connected to the canister by a suction hose 13 generally designated having electrical conductors therein to energize a brush drive motor (not shown) in nozzle 12.

Canister 11 includes a base 14 and a hood 15 pivotally mounted to the base for selective movement between a closed disposition, as shown in FIG. 1, and an open disposition, as shown in FIG. 2. When disposed in the open position the hood provides access to a dirt-collecting space 16 within base 14.

The vacuum cleaner structure further includes a bag mount generally designated 17 mounted to base 14 for removably mounting a dirt-collecting filter bag 18 thereto. Bag mount 17 includes a pair of pivot posts 19 pivotally received in suitable pivot supports 20 formed integrally with the base 14, as illustrated in FIG. 3.

The bag mount further defines a mounting plate 21 having turned side channels 22 adapted to receive a plate 23 provided on the filter bag 18, as shown in FIG. 3, for removably mounting the filter bag to the mounting plate.

The mounting plate defines a central opening 24 for removably receiving a suction hose end connector 25. An annular seal 26 is mounted coaxially of the opening 24 to the mounting plate by a mounting ring 27.

Hose 13, as shown in FIG. 1, includes a hose connector 28 removably connected to the hose end connector 25 for providing a suction connection from the nozzle 12 into the filter bag 18 in the normal use of the vacuum cleaner. Hose connector 28 may advantageously be arranged to provide a swivel connection between hose 13 and hose end connector 25.

As shown in FIG. 2, an electrical power plug receptacle 29 is mounted to the base 14 adjacent the bag mount 17 and connected to a power source by conductors in base 14 and connected circuitry including a suction motor (not shown) and a power cord and plug (not shown). When the filter bag 18 is mounted to the bag mount, the bag mount is disposed in the full line approximately horizontal position shown in FIG. 5 so as to underlie a hose end passage and guide 30 on hood 15 through which the hose end connector 28 extends into sealed association with gasket 26 and filter bag 18. At the same time, the disposition of the power plug receptacle 29, as shown in FIG. 2, provides for an automatic connection of the power plug means 31 carried by the hose end connector 28 and hose end connector 25 connected to the end of connector 28 so that both suction and electrical connection is made concurrently.

The pivotally mounted bag mount is biased to pivot clockwise to the upright position shown in broken lines in FIG. 5 by a suitable spring 32 which advantageously may be a coil spring, acting between the pivot support 20 and a bracket 33 mounting the pivot post to the mounting plate 21. In the upright position, shown in broken lines in FIG. 5, with the mounting plate 21 extending approximately horizontally but rotated approximately 180° from the solid line position of FIG. 5, the bag mount acts as a positive obstruction preventing the closing of hood 15 on the base 14 and thereby preventing the user from operating the vacuum cleaner in the absence of a filter bag 18 installed on the bag mount and also effectively covering the receptacle 29 thus eliminating a shock hazard. The weight of an empty filter bag is sufficient to overcome the bias of the bag mount and pivots the bag to rest in the operating position shown in FIG. 2, with the mounting plate substantially in the position shown in solid lines in FIG. 5.

In the illustrated embodiment, the mounting plate 21 includes a rearwardly and downwardly projecting annular flange 34 adapted to be received in an opening 35 in the bag plate 23 for releasably retaining the bag plate in sealed association with the bag mount.

Hose connector 25 illustrated in FIG. 6 (hose 13 and hose end connector 28 have been omitted for clarity) is removably installed in guide 30 and retained in association therewith by a latch 36. The hose end connector 25 includes a plug housing portion 37 which surrounds a plug assembly and guides the power plug 31 of the hose end into electrically connected association with the plug receptacle 29.

The use of the spring-biased bag mounting plate further provides the desirable feature of causing the user to arrange the bag 18 in an extended disposition within the bag space 16 for improved filtering action, in installing the bag on the bag mount so as to dispose the bag mount in the hose end receiving disposition illustrated in FIG. 2 and in solid lines in FIG. 5. As shown in FIG. 2, hood 15 is provided with a latch 38 for removably retaining the hood in the closed disposition of FIG. 1, whereby the hose end connector 28 may be selectively installed and removed with the canister maintained in the closed arrangement of FIG. 1.

The foregoing disclosure of specific embodiments is illustrative of the broad inventive concepts comprehended by the invention.

We claim:

1. In a vacuum cleaner canister having a base defining a filter bag space and an access opening to said space, and a hood removably closing said access opening, the improvement comprising:

means for removably mounting a filter bag in said bag space comprising a bag mount carried by the base;

means for automatically positioning the bag mount (a) in a blocking disposition for preventing the closing of said access opening by said hood as an incident of the bag mount being free of a filter bag mounted thereto, and (b) in an operative disposition and concurrently permitting the closing of said access openings by said hood, said bag mount being caused to be automatically disposed in said operative position as an incident of the mounting of a filter bag to said bag mount and reception of said filter bag in said bag space; and means on the hood defining an access opening aligned with the position of the bag mount in the operative disposition for permitting a suction hose end to be extended therethrough into removably connected association with said bag mount for delivering dirt-laden air to the filter bag.

2. The vacuum cleaner canister structure of claim 1 wherein said bag mount defines an annular seal for removably sealingly engaging the suction hose end as an incident of the suction hose end being inserted against the bag mount for operative connection to a filter bag connected to the bag mount.

3. The vacuum cleaner canister structure of claim 1 wherein said bag mount is movably mounted to said base.

4. The vacuum cleaner canister structure of claim 1 wherein said bag mount is pivotally mounted to said base.

5. The vacuum cleaner canister structure of claim 1 wherein said means for automatically positioning the bag mount includes biasing means for biasing the bag mount to said blocking position in the absence of a filter bag being mounted thereto.

6. The vacuum cleaner canister structure of claim 1 wherein said means for automatically positioning the bag mount includes coil spring means for biasing the bag mount to said blocking position in the absence of a filter bag being mounted thereto.

7. The vacuum cleaner canister structure of claim 1 wherein said means for automatically positioning the bag mount comprises means for disposing the bag mount fully within said bag space as an incident of a filter bag being mounted thereto.

8. The vacuum cleaner canister structure of claim 1 wherein said means for automatically positioning the bag mount comprises means for disposing the bag mount fully within said bag space as an incident of a filter bag being mounted thereto and to project outwardly from said bag space when the hood is spaced from the access opening in the absence of a filter bag being mounted to said bag mount.

9. The vacuum cleaner canister structure of claim 1 wherein said means for automatically positioning the bag mount comprises means for causing the bag mount to extend approximately horizontally within said bag space as an incident of a filter bag being mounted thereto.

10. The vacuum cleaner canister structure of claim 1 wherein said means for automatically disposing the bag mount comprises means for disposing the bag mount fully within said bag space as an incident of a filter bag being mounted thereto and projecting substantially therefrom to interfere with closing of the hood in the absence of a filter bag being mounted to said bag mount.

11. In a vacuum cleaner canister having a base defining a filter bag space and an access opening to said space, and a hood removably closing said access opening, the improvement comprising:
   means for removably mounting a filter bag in said bag space comprising a bag mount pivotally mounted to the base;
   spring means for biasing the bag mount to a preselected hood-blocking disposition, said bag mount being automatically disposed (a) in a blocking disposition for preventing the closing of said access opening by said hood as an incident of the bag mount being free of a filter bag mounted thereto, and (b) in an operative disposition and concurrently permitting the closing of said access opening by said hood, said bag mount being caused to be disposed in said operative position as an incident of the mounting of a filter bag to said bag mount and reception of said filter bag in said bag space; and
   means on the hood defining an access opening aligned with the position of the bag mount in the operative disposition for permitting a suction hose end to be extended therethrough into removably connected association with said bag mount for delivering dirt-laden air to the filter bag.

12. The vacuum cleaner canister structure of claim 11 wherein said bag mount defines an annular seal for removably sealingly engaging the suction hose end as an incident of the suction hose end being inserted against the bag mount for communication with a filter bag mounted thereto.

13. The vacuum cleaner canister structure of claim 11 wherein said spring means comprises a coil spring.

14. The vacuum cleaner canister structure of claim 11 wherein said base is provided with a stop shoulder means for limiting the movement of the bag mount by said spring means.

15. The vacuum cleaner canister structure of claim 11 wherein in the absence of a filter bag on said bag mount said spring means disposes said bag mount in a hood-blocking position.

16. The vacuum cleaner canister structure of claim 15 wherein said base is provided with an electrical receptacle which is covered when said bag mount is disposed in said hood-blocking position.

17. In a vacuum cleaner having a housing defining a dirt collection space, said housing having a hood which may be opened to provide access to said space, the improvement comprising:
   obstruction means movably mounted to said housing for preventing closing of said hood in the absence of installation of a dirt-collecting bag in said space;
   plug receptacle means fixed to said housing for providing an electrical connection to electrical circuitry within said housing; and
   hose connecting means mounted to said obstruction means for movement therewith into cooperating association with said fixed receptacle means for connecting a hose end to the housing.

18. The vacuum cleaner of claim 16 wherein said means for preventing closing of said hood comprises an automatically positioned dirt-collecting bag mount in said housing.

19. In a vacuum cleaner having a selectively closable enclosure and a filter bag mount in said enclosure for removable mounting of a filter bag thereinto, the improvement comprising
   a portion of the filter bag mount and enclosure preventing closing of said enclosure as an incident of the absence of a filter bag mounted to the bag mount.

* * * * *